United States Patent
Allston et al.

(10) Patent No.: US 8,679,344 B2
(45) Date of Patent: Mar. 25, 2014

(54) PROCESS FOR SOLVENT SHIFTING A NANOPARTICLE DISPERSION

(75) Inventors: Thomas D. Allston, Lima, NY (US); Laura M. Herder, West Hennetta, NY (US); Andreas Langner, Pittsford, NY (US); Kenneth J. Reed, Rochester, NY (US)

(73) Assignee: Cerion Technology, Inc., Rochester, NY (US)

( * ) Notice: Subject to any disclaimer, the term of this patent is extended or adjusted under 35 U.S.C. 154(b) by 495 days.

(21) Appl. No.: 12/549,776

(22) Filed: Aug. 28, 2009

(65) Prior Publication Data

US 2010/0152077 A1 Jun. 17, 2010

Related U.S. Application Data

(63) Continuation-in-part of application No. PCT/US2008/087133, filed on Dec. 17, 2008.

(51) Int. Cl.
- *B01D 61/00* (2006.01)
- *B01F 17/00* (2006.01)
- *C01B 13/14* (2006.01)
- *C10L 1/12* (2006.01)

(52) U.S. Cl.
USPC ......... 210/644; 44/354; 423/21.5; 423/592.1; 502/304; 516/924; 977/773; 977/811; 977/840

(58) Field of Classification Search
USPC ......... 210/634, 639, 644, 651, 806; 423/21.1, 423/21.5, 592.1; 977/773, 811, 840, 900; 44/354, 457, 500; 516/924–928; 428/402, 403; 264/5; 502/304
See application file for complete search history.

(56) References Cited

U.S. PATENT DOCUMENTS

| | | | |
|---|---|---|---|
| 4,231,893 | A | 11/1980 | Woodhead |
| 5,449,387 | A | 9/1995 | Hawkins |
| 5,938,837 | A | 8/1999 | Hanawa et al. |
| 6,093,223 | A | 7/2000 | Lemaire et al. |
| 6,133,194 | A | 10/2000 | Cuif et al. |
| 6,136,048 | A | 10/2000 | Birchem et al. |
| 6,210,451 | B1 | 4/2001 | Chopin et al. |
| 6,271,269 | B1 | 8/2001 | Chane-Ching et al. |
| 6,413,489 | B1 * | 7/2002 | Ying et al. ............ 423/600 |

(Continued)

FOREIGN PATENT DOCUMENTS

| | | |
|---|---|---|
| EP | 0208580 | 1/1987 |
| WO | 2004065529 | 8/2004 |

(Continued)

OTHER PUBLICATIONS

Swanand D. Patil, "Fundamental Aspects of Regenerative Cerium Oxide Nanoparticles and their Applications in Nanobiotechnology", pHD dissertation presented at the University of Central Florida, Summer Term 2006, downloaded from Google Advanced Scholar Search, Jan. 31, 2012.*

(Continued)

*Primary Examiner* — Joseph Drodge
(74) *Attorney, Agent, or Firm* — RatnerPrestia

(57) ABSTRACT

A process for replacing the continuous phase of a nanoparticle dispersion with a less polar phase, includes filtering the dispersion through a semi-permeable membrane filter to remove the continuous phase, and introducing a less polar phase.

31 Claims, 5 Drawing Sheets

(56) References Cited

U.S. PATENT DOCUMENTS

| | | |
|---|---|---|
| 6,649,156 B1 | 11/2003 | Chane-Ching |
| 6,752,979 B1 * | 6/2004 | Talbot et al. ............... 423/592.1 |
| 6,869,584 B2 | 3/2005 | Ying et al. |
| 7,008,965 B2 | 3/2006 | Chane-Ching |
| 7,063,729 B2 | 6/2006 | Valentine et al. |
| 7,169,196 B2 | 1/2007 | Wakefield et al. |
| 7,195,653 B2 | 3/2007 | Hazarika et al. |
| 7,232,556 B2 * | 6/2007 | Yadav ........................ 423/592.1 |
| 7,384,888 B2 | 6/2008 | Kuno |
| 7,419,516 B1 | 9/2008 | Seal et al. |
| 7,683,098 B2 * | 3/2010 | Yadav ............................. 516/34 |
| 7,914,617 B2 * | 3/2011 | Yadav ........................... 106/483 |
| 8,076,846 B2 * | 12/2011 | Mizuno et al. ................ 313/512 |
| 2003/0182848 A1 | 10/2003 | Collier et al. |
| 2003/0221362 A1 | 12/2003 | Collier et al. |
| 2004/0029978 A1 | 2/2004 | Chane-Ching |
| 2004/0035045 A1 | 2/2004 | Caprotti et al. |
| 2004/0241070 A1 | 12/2004 | Noh et al. |
| 2005/0031517 A1 | 2/2005 | Chan |
| 2005/0060929 A1 | 3/2005 | Caprotti et al. |
| 2005/0152832 A1 | 7/2005 | Ying et al. |
| 2006/0000140 A1 | 1/2006 | Caprotti et al. |
| 2006/0005465 A1 | 1/2006 | Blanchard et al. |
| 2007/0290384 A1 * | 12/2007 | Kodas et al. ....................... 264/5 |
| 2009/0298684 A1 * | 12/2009 | Zhou et al. ..................... 502/326 |
| 2010/0135937 A1 * | 6/2010 | O'Brien et al. ................. 424/59 |
| 2010/0199547 A1 * | 8/2010 | Reed ............................... 44/354 |
| 2011/0056123 A1 * | 3/2011 | Difrancesco et al. ........... 44/410 |

FOREIGN PATENT DOCUMENTS

| | | |
|---|---|---|
| WO | 2005012465 | 2/2005 |
| WO | 2008002323 A2 | 1/2008 |
| WO | 2008030815 A2 | 3/2008 |

OTHER PUBLICATIONS

I. Limayen, C. Charcosset, and H. Fessi, Purification of Nanoparticle Suspensions by a Concentration/Diafiltration Process, Separation and Purification Technology 38 (2004) 1-9.

G. Dalwadi, H. Benson, and Y. Chen, Comparison of Diafiltration and Tangential Flow Filtration for Purification of Nanoparticle Suspensions, Pharmaceutical Research 22 (2005) 2154-2162.

S. Sweeney, G. Woehrle, and J. Hutchison, Rapid Purification and Size Separation of Gold Nanoparticles via Diafiltration, J. Am. Chem. Soc. (2006) 128, 3190-3197.

* cited by examiner

PROCESS FOR SOLVENT SHIFTING A NANOPARTICLE DISPERSION

CROSS-REFERENCE TO RELATED APPLICATIONS

This application is a continuation-in-part of PCT/US2008/087133, filed Dec. 17, 2008 in the names of Kenneth Reed et al. This application is also related to: PCT/US07/077,545, METHOD OF PREPARING CERIUM DIOXIDE NANOPARTICLES, and PCT/US07/077,535, CERIUM DIOXIDE NANOPARTICLE-CONTAINING FUEL ADDITIVE, both filed Sep. 4, 2007; which applications claim the benefit of priority from: Provisional Application Ser. No. 60/824,514, CERIUM-CONTAINING FUEL ADDITIVE, filed Sep. 5, 2006; Provisional Application Ser. No. 60/911,159, REVERSE MICELLAR FUEL ADDITIVE COMPOSITION, filed Apr. 11, 2007; and Provisional Application Ser. No. 60/938,314, REVERSE MICELLAR FUEL ADDITIVE COMPOSITION, filed May 16, 2007. The disclosures of all of these applications are incorporated herein by reference.

FIELD OF THE INVENTION

The present invention relates in general to nanoparticle dispersions, to methods of solvent shifting, and transferring nanoparticles into a less polar medium while maintaining dispersion stability. The invention further relates to nanoparticles of cerium dioxide and moreover to doped nanoparticles of cerium dioxide containing one or more transition metals (M).

BACKGROUND OF THE INVENTION

Aqueous processing offers a convenient route to the preparation of nanoparticle dispersions, such as aqueous dispersions of cerium dioxide nanoparticles. However, to be useful in applications such as a fuel-borne catalyst, particles such as cerium dioxide nanoparticles must exhibit stability in a non-polar medium, for example, diesel fuel, such that these particles remain suspended in the fuel and do not settle out. Thus, these particles, although most readily formed and suspended in a highly polar aqueous phase, must then be transferred to a substantially non-polar phase. This problem is conventionally addressed by the use of particle stabilizers. However, there is need for additional improvement as most particle stabilizers used to prevent particle agglomeration in an aqueous environment are ill-suited to the task of stabilization in a non-polar environment. When placed in a non-polar solvent, such particles tend to immediately agglomerate and, consequently, lose some, if not all, of their desirable particulate properties. Thus, it would be desirable to form stable nanoparticles in an aqueous environment, retain the same stabilizer on the particle surface, and then be able to transfer these particles to a non-polar solvent, wherein the particles would remain stable and form a homogeneous mixture or dispersion. Availability of a simplified and economical transfer process would, for example, eliminate the necessity for changing the affinity of a surface stabilizer from polar to non-polar. Changing stabilizers can involve a difficult displacement reaction or separate, tedious isolation and re-dispersal methods such as, for example, precipitation and subsequent re-dispersal with a new stabilizer using, for instance, a ball milling process, which can take several days.

While a less polar water-miscible solvent may be combined with an aqueous particle dispersion, it is often necessary to remove water from the resulting mixture in order to achieve the desired solvent polarity reduction and to increase particle suspension density (i.e. concentration). In general, the process of altering the ratio of components in a multi-component solvent mixture is referred to as solvent shifting. Effective means for removing salts and adding water via diffusion through semi-permeable (semi-porous) membranes are well known in the filtration art in the form of dialysis procedures. In dialysis, an aqueous solution or particle dispersion to be purified is placed into a dialysis bag (internal phase), and typically suspended in an aqueous (external phase) bath, from which water diffuses into the bag while salts diffuse out through holes in the semi-permeable dialysis membrane, driven only by concentration gradients (osmosis). The external water bath is changed periodically to restore the concentration gradients that are the source of the osmotic pressure.

Dialysis and diafiltration methods have been employed to purify biological materials by replacing minor amounts of organic solvents, organic surfactants, reaction by-products and salts, with water in order to reduce the toxicity of the final material. Diafiltration, sometimes referred to as cross-flow microfiltration, is a transverse flow filtration method that typically employs a bulk aqueous solvent flow transverse to a semi-permeable membrane. Using this technique, water and dissolved salts under pressure diffuse in a direction tangential to the bulk flow and pass through holes in the semi-permeable membrane. Water is typically added back into the feed-stream or sample reservoir to maintain volume. Diafiltration is commonly employed to purify aqueous protein solutions, for example. The pore sizes of semi-permeable membranes used in diafiltration columns are typically characterized by the molecular weight cut-off (MWCO) value. In practice, the column will retain about 90% of dissolved proteins of a molecular weight greater than the MWCO. Diafiltration columns are typically constructed of materials that are compatible with aqueous solvent (e.g. polyurethane internal glue, polycarbonate and polysulfone casings). Once more, filtration methods employing semi-permeable membranes, such as dialysis and diafiltration, typically result in a net addition of water such that a solvent shift to increased polarity is achieved.

Conventional diafiltration techniques have been used to help purify an aqueous-based, polar dispersion of nanoparticles, purifying and maintaining a highly polar continuous phase. For example, in regard to purification of nanoparticles by dialysis and diafiltration, Limayen et al., *Separation and Purification Technology* 38 (2004)1-9, describe the removal of organic (ethyl acetate) solvent and polyvinyl alcohol surfactant from an aqueous suspension of drug (indomethacin) loaded nanocapsules by cross-flow microfiltration, wherein pure water is added to the feed-stream during the final continuous diafiltration (constant volume) step. Dalwadi et al., *Pharmaceutical Research* 22 (2005) 2154-2162, studied the removal of an organic surfactant (polyvinyl alcohol) from an aqueous dispersion of poly(lactide-co-glycolide) nanoparticles by a variety of methods, including (1) a dialysis technique using freshwater as the external phase, and (2) a diafiltration technique in which the feed was diluted with water at the same rate as filtrate was generated. Feeney et al., *J. Am. Chem. Soc.* (2006) 128, 3190-3197, studied the purification and size-separation of water-soluble thiol-stabilized 3-nm gold nanoparticles, concluding that diafiltration is rapid and superior to other techniques, including dialysis, a combination of solvent washes, chromatography, and ultracentrifugation, in removing residual thiol ligands and disulfides. Water solvent was added to the retentate reservoir to maintain a constant volume (continuous) diafiltration process. In each of these studies teaching purification of nanoparticle dispersions, diafiltration is conducted in a continuous mode with addition of pure water to the feed-stream or sample/retentate reservoir, removing non-polar organic materials or other less polar sobstances to provide a purified polar, aqueous-based dispersion. None of these references employs dialysis or diafiltration for solvent shifting in the opposite direction, to effect a net removal of water or other polar component and to substitute a solvent of reduced polarity.

Thus, there remains a need for an efficient and economical method to synthesize stable nanoparticles, such as cerium dioxide nanoparticles and transition metal-containing cerium dioxide nanoparticles, in a polar, typically aqueous environment, and then transfer these particles to a less polar or, ultimately, a non-polar medium, wherein a stable homogeneous dispersion is maintained.

SUMMARY OF THE INVENTION

It is an object of the present invention to advance the art of nanoparticle preparation and handling. With this object in mind, the present invention provides a process for replacing the continuous phase of a nanoparticle dispersion with a less polar phase, the process comprising:

filtering said dispersion through a filter comprising a semi-permeable membrane to remove said continuous phase, and
introducing the less polar phase.

At the heart of the present invention is our discovery that a solvent shift to a less polar phase can be achieved utilizing filtration methods employing semi-permeable membranes, such as dialysis and diafiltration, in a way that runs counter to conventional usage, to effect a net removal of water, in combination with introduction of a less polar solvent. This enables a more efficient and economical process of transferring dispersions of nanoparticles into a less polar medium, and, ultimately, into a non-polar medium, while maintaining a stable homogeneous dispersion.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1A:
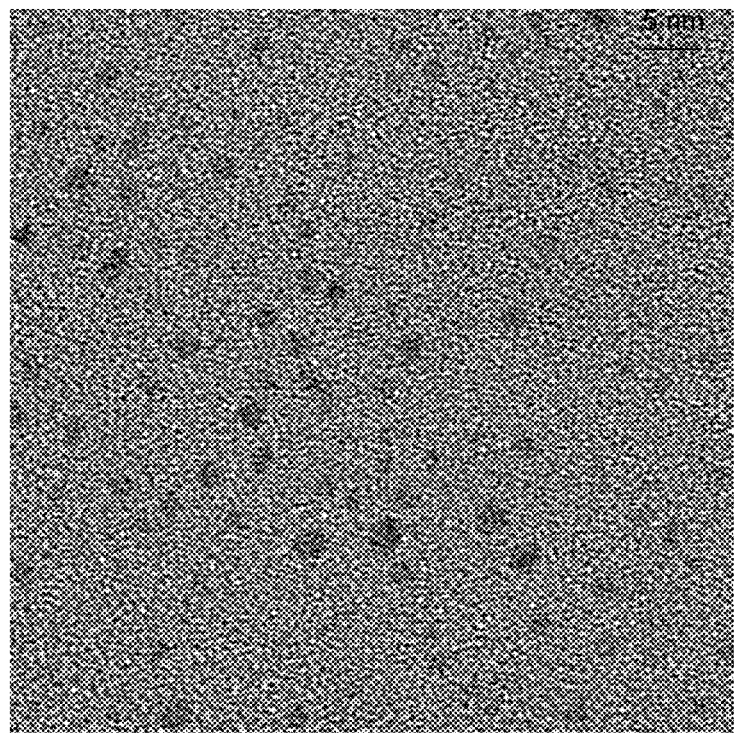
FIGS. 1A and 1B are, respectively, a TEM image and a particle size-frequency analysis by TEM of isothermally processed Cu-containing $CeO_2$ nanoparticles, prepared as described in Example 5.

It is to be understood that elements not specifically shown or described may take various forms well known to those skilled in the art. The invention is defined by the claims.

In accordance with the invention, a method of solvent shifting nanoparticle dispersions is provided wherein the method comprises (a) filtering the nanoparticle dispersion through a semi-permeable membrane to remove a continuous phase, and (b) introducing a phase of lower polarity.

Nanoparticles are particles having a mean diameter of less than 100 nm. For the purposes of this disclosure, unless otherwise stated, the diameter of a nanoparticle refers to its hydrodynamic diameter, which is the diameter determined by dynamic light scattering technique and includes molecular adsorbates and the accompanying solvation shell of the particle. Alternatively, the geometric particle diameter can be estimated using microscopy, such as transmission electron micrography (TEM).

Nanoparticle dispersions are described as bi-phasic, wherein the continuous phase is typically provided by a liquid solvent (e.g. water, glycol ether, hydrocarbon) and the discontinuous phase refers to the nanoparticles, which may be crystalline or amorphous solid particles. In the context of the present disclosure, maintaining dispersion stability relates to maintaining both chemical as well as physical properties of the nanoparticle dispersion, including preventing agglomeration, settling, or change in thermodynamic behavior. In the context of the present disclosure, the term "homogeneous dispersion" is understood as meaning that, for a nanoparticle suspension, the dispersed discontinuous phase, here nanoparticles, has substantially identical spatial distribution throughout the continuous phase.

Solvent polarity is related to the permanent dipole moment of a given molecular solvent or medium. Many polarity scales and parameters exist and are well known to those skilled in the chemical arts. Dielectric constant, the Grunwald Winstein mY scale, the Kosower Z scale and Hansen Solubility Parameters (HSP) are among the more widely known polarity scales. By way of example, a less polar phase or solvent will possess a smaller dielectric constant. Solvents with a dielectric constant less than about 15 are considered non-polar. Solvents with a polar Hansen Solubility Parameter less than 16.0 are less polar than water. For the purposes of this disclosure, a solvent or phase is considered to be less polar than another solvent or phase, if judged to be so using any one of the aforementioned polarity scales.

Semi-permeable membrane filters separate the components of a mixture on the basis of molecular size, allowing sufficiently small molecules to pass through by diffusion or under pressure, while larger molecules are blocked. They are also referred to as selectively-permeable membranes, partially-permeable membranes, differentially-permeable membranes, or ultrafiltration membranes. The materials retained by the filter, including the stabilized nanoparticles, are referred to as the concentrate or retentate. The discarded salts (e.g. unreacted materials and reaction by-products) and solvent are termed the filtrate or permeate.

Semi-permeable membranes are widely available commercially in the form of dialysis tubing and dialfiltration columns, the latter available in hollow fiber, spiral wound and cassette formats. Semi-permeable membranes are typically manufactured from regenerated cellulose (cellulose esters), polysulfone polymer or other polymer materials. A suitable semi-permeable membrane would be sufficiently non-porous so as to retain the majority of the formed nanoparticles, while allowing smaller molecules such as salts, water or other solvent molecules to pass through the membrane. In this way, the nanoparticles and the associated bound stabilizer can be purified and/or concentrated. However, the pore diameter must be sufficient to allow passage of water and salt molecules. For example, many synthetic preparations of nanoparticles of cerium dioxide produce ammonium nitrate as a by-product along with unreacted cerium nitrate; both salts should be completely or at least partially removed from the reaction mixture. In addition, in some embodiments, the average membrane pore size must be sufficiently small to retain cerium dioxide particles of 1.5 nm diameter or greater in the retentate. This pore size would correspond to a protein size of approximately 2 kiloDaltons.

Dialysis elements such as tubing or bags are employed in some embodiments of the present invention to effect a solvent shift. wherein a solvent or phase of higher polarity is present inside the dialysis bag (internal phase), while a solvent or phase of lower polarity is present in the (external phase) bath. In this manner, concentration gradients are established such that the higher polarity solvent in the dialysis bag (internal phase) preferentially diffuses out of the bag, while lower polarity solvent preferentially diffuses into the bag. To advance the progress of the solvent shift, a minor or major amount of the lower polarity solvent or phase may be included inside the dialysis bag as well. In one embodiment of the invention, an aqueous dispersion of nanoparticles is placed inside a dialysis bag, and the bag is suspended in a bath containing a less polar glycol ether or a mixture of glycol ethers. A solvent shift of the nanoparticles from a high polarity phase (water) to a low polarity phase (glycol ether(s)) will result after several hours or days, during which the external phase glycol bath is periodically replenished to maintain the concentration gradients.

Diafiltration columns and cassettes for use in the invention may be configured in an open loop fashion wherein the concentrate or retentate is collected in a separate vessel (a process sometimes referred to as transverse flow filtration), or in a closed loop or recirculation mode in which the concentrate or retentate is returned to the sample vessel. If no additional solvent is added to the sample vessel during diafiltration, or if the rate of addition of solvent to the sample vessel is less than the rate of fluid loss in the filtrate or permeate, then concentration will occur. If the rate of solvent addition matches the rate of fluid loss, a constant volume diafiltration will occur, which is termed continuous diafiltration.

In embodiments of the present invention, solvent is introduced either continuously (such as drop-wise) or in discrete additions, the latter resulting in variable total fluid volumes, which is termed discontinuous diafiltration. In a closed loop configuration, additional solvent may be added in-line to the feed-stream or to the retentate return-line, but more typically is added directly to the sample vessel. If an alternate solvent is added during diafiltration, then solvent shifting may occur. In one embodiment of the invention, an aqueous dispersion of nanoparticles is placed in the sample vessel, and diafiltration in a recirculation-loop is initiated. A glycol ether or a mixture of glycol ethers is introduced into the sample vessel. A solvent shift of the nanoparticles from a high polarity phase (water) to a low polarity phase (glycol ether(s)) results after several minutes or hours as water is filtered out into the filtrate or permeate line.

One or more diafiltration units may be connected in series to achieve a single pass concentration of product, or the units may be placed in parallel for very high volumetric throughput. The diafiltration units may be disposed both in series and parallel to achieve both high volume and rapid throughput.

In a particular embodiment of the invention, the nanoparticles comprise cerium dioxide (ceria). Cerium-containing nanoparticles can be prepared by a variety of techniques known in the art. Some of these synthetic techniques are described in the following publications: U.S. Pat. Nos. 6,271, 269; 6,649,156; 7,008,965; U.S. Patent Appl. Publ. Nos. 2004/0029978 (abandoned Dec. 7, 2005); 2006/0005465; U.S. Pat. No. 7,025,943; WO 2008/002223 A2; U.S. Pat. No. 4,231,893; U.S. Patent Appl. Publ. Nos. 2004/0241070; 2005/0031517; U.S. Pat. Nos. 6,413,489; 6,869,584; U.S. Patent Appl. Publ. No. 2005/0152832; U.S. Pat. No. 5,938, 837; European Patent Application EP 0208580, published 14 Jan. 1987; U.S. Pat. Nos. 7,419,516; and 6,133,194.

As described above, crystalline cerium dioxide nanoparticles can be prepared by various procedures. Typical synthetic routes utilize water as a solvent and yield an aqueous mixture of nanoparticles and one or more salts. For example, cerium dioxide particles can be prepared by reacting the hydrate of cerium (III) nitrate with hydroxide ion from, for example, aqueous ammonium hydroxide, thereby forming cerium (III) hydroxide, as shown in equation (1a). Cerium hydroxide can be oxidized to cerium (IV) dioxide with an oxidant such as hydrogen peroxide, as shown in equation (1b). The analogous tris hydroxide stoichiometry is shown in equations (2a) and (2b).

$$Ce(NO_3)_3(6H_2O) + 2\,NH_4OH \rightarrow Ce(OH)_2NO_3 + 2\,NH_4NO_3 + 6H_2O \quad (1a)$$

$$2\,Ce(OH)_2NO_3 + H_2O_2 \rightarrow 2\,CeO_2 + 2\,HNO_3 + 2\,H_2O \quad (1b)$$

$$Ce(NO_3)_3(6H_2O) + 3\,NH_4OH \rightarrow Ce(OH)_3 + 3NH_4NO_3 + 6\,H_2O \quad (2a)$$

$$2\,Ce(OH)_3 + H_2O_2 \rightarrow 2\,CeO_2 + 4\,H_2O \quad (2b)$$

Complexes formed with very high base levels, e.g. 5:1 OH:Ce, also provide a route to cerium oxide, albeit at much larger grain sizes if not properly growth-restrained.

In some cases, especially where ammonium hydroxide is not present in excess relative to the cerous ion, the species $Ce(OH)_2(NO_3)$ or $(NH_4)_2Ce(NO_3)_5$ may initially be present, subsequently undergoing oxidation to cerium dioxide.

Commonly assigned PCT/US2007/077545, METHOD OF PREPARING CERIUM DIOXIDE NANOPARTICLES, filed Sep. 4, 2007, describes a mixing device that is capable of producing $CeO_2$ nanoparticles down to 1.5 nm, in high yield and in very high suspension densities. The reactor includes inlet ports for adding reactants, a propeller, a shaft, and a motor for mixing. The reaction mixture is contained in a reactor vessel. Addition to the vessel of reactants such as cerium nitrate, an oxidant, and hydroxide ion can result in the formation of $CeO_2$ nanoparticles, which are initially formed as very small nuclei. Mixing causes the nuclei to circulate; as the nuclei continuously circulate through the reactive mixing regime, they grow (increase in diameter) as they incorporate fresh reactants. Thus, after an initial steady state concentration of nuclei is formed, this nuclei population is subsequently grown into larger particles in a continuous manner. Unless grain growth restrainers are employed to terminate the growth phase, this nucleation and growth process is not desirable if one wishes to limit the final size of the particles while still maintaining a high particle suspension density.

A solvent such as water is often employed in these synthetic techniques. Water readily dissolves the reactants (typically metal nitrate salts) providing a high concentration of reactants that in turn leads to a high suspension density in the aqueous product dispersion. Subsequent to the preparation, the cerium dioxide nanoparticle dispersion is typically purified, wherein the unreacted cerium nitrate and waste by-products such as ammonium nitrate are removed, most conveniently, for example, by diafiltration. In order to promote subsequent solvent shifting into less polar media, including non-polar media, it is desirable to reduce the ionic strength to a conductivity of about 5 mS/cm or less. The product dispersion may be diluted or concentrated before, during, or after the purification process.

Regardless of whether the synthesized nanoparticles are made in a hydrophilic or hydrophobic medium, however, the ceria nanoparticles normally require a stabilizer to prevent undesirable agglomeration. The ceria nanoparticle stabilizer is a critical component of the reaction mixture. Desirably, the nanoparticle stabilizer is water-soluble and forms weak bonds with the cerium ion. $K_{BC}$ represents the binding constant of the nanoparticle stabilizer to cerium ion in water. Log $K_{BC}$ for the nitrate ion is 1 and for hydroxide ion is 14. Most desirably, log $K_{BC}$ lies within this range, preferably in the middle of this range. Useful nanoparticle stabilizers include alkoxysubstituted carboxylic acids, α-hydroxyl carboxylic acids, α-keto carboxylic acids such as pyruvic acid, and small organic polyacids such as tartaric acid and citric acid. Examples of alkoxylated carboxylic acids include: methoxyacetic acid (MAA), 2-(methoxy)ethoxy acetic acid and 2-[2-(2-methoxyethoxy)ethoxy]acetic acid (MEEA). Among the α-hydroxycarboxylic acids, examples include lactic acid, gluconic acid and 2-hydroxybutanoic acid. Polyacids include ethylenediaminetetraacetic acid (EDTA), tartaric acid, and citric acid. Combinations of compounds with large $K_{BC}$ such as EDTA with weak $K_{BC}$ stabilizers such as lactic acid are also useful at particular ratios. Large $K_{BC}$ stabilizers such as gluconic acid may be used at a low level, or with weak $K_{BC}$ stabilizers such as lactic acid.

In another embodiment, the ceria nanoparticle stabilizer includes a compound of formula (2a). In formula (2a), R represents hydrogen, or a substituted or unsubstituted alkyl group or aromatic group such as, for example, a methyl group, an ethyl group or a phenyl group. More preferably, R represents a lower alkyl group such as a methyl group. $R^1$ represents hydrogen or a substituent group such as an alkyl group. In formula (Ia), n represents an integer of 0-5, preferably 2, and Y represents H or a counterion such as an alkali metal, for example, $Na^+$ or $K^+$. The stabilizer binds to the nanoparticles and prevents agglomeration of the particles and the subsequent formation of large clumps of particles.

$$RO(CH_2CH_2O)_nCHR^1CO_2Y \qquad (2a)$$

In another embodiment, the ceria nanoparticle stabilizer is a dicarboxylic acid, including "gemini carboxylates", where the carboxylic groups are separated by at most two methylene groups; and derivatives thereof, such as those represented by formula (2b), wherein each $R^2$ independently represents a substituted or unsubstituted alkyl, alkoxy or polyalkoxy group, or a substituted or unsubstituted aromatic group. X and Z independently represent H or a counterion such as $Na^+$ or $K^+$, and p is 1 or 2.

$$XO_2C(CR^2)_pCO_2Z \qquad (2b)$$

Useful nanoparticle stabilizers are also found among α-hydroxysubstituted carboxylic acids such as lactic acid and among the polyhydroxysubstituted acids such as gluconic acid.

Although substantially pure cerium dioxide nanoparticles are beneficially included in applications such as fuel additives, it may be of further benefit to use cerium dioxide doped with components that may result in the formation of additional oxygen vacancies. Herein, the term "doped particle" refers to a particle containing one or more foreign or dopant ions present in concentrations less than 2 mole percent (20,000 parts per million (ppm)). Doping of cerium dioxide with metal ions to improve ionic transport, reaction efficiency and other properties is disclosed in, for example, U.S. Pat. Nos. 6,752,979; 6,413,489; 6,869,584; 7,169,196 B2; 7,384,888B2; and U.S. Patent Appl. Publ. No. 2005/0152832. In this disclosure, the term "transition metal" is understood to encompass the 40 chemical elements 21 to 30, 39 to 48, and 72 to 80, which are included in Periods 4, 5, 6, respectively, of the Periodic Table. In particular embodiments, the transition metal dopant is selected from the group consisting of Fe, Mn, Cr, Ni, W, Co, V, Cu, Mo, Zr, Y and combinations thereof. In other embodiments, the transition metals are Zr or Y, alone or combined with Fe. Herein, the term "lattice engineered particle" refers to a particle containing one or more foreign or dopant ions present in concentrations greater than 2 mole percent (20,000 ppm), up to about 80 mole percent (800,000 ppm).

In another aspect of the present invention, a process is provided for forming a homogeneous dispersion containing stabilized cerium dioxide nanoparticles, at least one nanoparticle stabilizer, a diluent less polar than water, at least one surfactant, and a non-polar medium. The process comprises the steps of: (a) providing an aqueous first dispersion comprising stabilized cerium dioxide nanoparticles produced by close association of the nanoparticle stabilizer with the cerium dioxide nanoparticles; (b) filtering the aqueous dispersion through a filter comprising a semi-permeable membrane to remove water; (c) introducing a less polar diluent, thereby forming a second dispersion stabilized cerium dioxide nanoparticles; and (d) combining the second dispersion with a surfactant and optionally a co-surfactant and a non-polar medium, thereby forming the homogeneous dispersion containing stabilized cerium dioxide nanoparticles.

Hereafter the process described in the preceding paragraph will be referred to as "the process for forming a homogeneous dispersion described above".

In another embodiment, the process for forming a homogeneous dispersion described above contains stabilized transition metal-containing cerium dioxide nanoparticles.

In another embodiment, the process for forming a homogeneous dispersion described above contains nanoparticles characterized by a mean hydrodynamic diameter in the range of about 1 nm to about 10 nm and a geometric diameter of less than about 4 nm.

In another embodiment, the process for forming a homogeneous dispersion described above contains cerium dioxide nanoparticles characterized by a primary crystallite size of about 2.5 nm±0.5 nm and comprised of one or at most two crystallites per particle edge length.

In another embodiment, the process for forming a homogeneous dispersion described above contains a filter comprising a dialysis bag or a diafiltration filter.

In another embodiment, the process for forming a homogeneous dispersion described above contains a less polar diluent comprising a non-ionic surfactant. Other useful non-ionic surfactants to effect the solvent shift include nonylphenyl ethoxylates having the formula, $C_9H_{19}C_6H_4(OCH_2CH_2)_n$ OH, wherein n is 4-6.

In another embodiment, the process for forming a homogeneous dispersion described above contains a less polar diluent comprising a glycol ether. Glycol ethers for use in the invention include compounds comprising an alcohol group and an ether group, in particular, a compound of formula (2c),

$$R^3(OCH_2CH_2)_mOH \qquad (2c)$$

wherein $R^3$ represents a substituted or unsubstituted alkyl group; and m is an integer from 1 to 8.

The glycol ether may also comprise a compound of formula (2d),

$$R^3\Phi(OCH_2CH_2)_mOH \quad (2d)$$

wherein $R^3$ represents a substituted or unsubstituted alkyl group; $\Phi$ is an aromatic group; and m is an integer from 4 to 6.

In another embodiment, the process for forming a homogeneous dispersion described above contains a glycol ether selected from the group consisting of diethylene glycol monomethyl ether, 1-methoxy-2-propanol, and a combination thereof.

In another embodiment, the process for forming a homogeneous dispersion described above further comprises the steps of repeating step b and step c in sequence one or more times before completing step d. Step b and step c in sequence comprises a solvent shift to phase of less polarity. These embodiments describe multiple solvent shifts to phases of lesser polarity before the final solvent shift into a non-polar medium.

In another embodiment, the process for forming a homogeneous dispersion described above comprises nanoparticles at a concentration of at least 2 wt. % and water at a maximum concentration of about 5.0 wt. %. In another embodiment, the homogeneous dispersion described above contains water at a maximum concentration of 0.4 wt %.

In another embodiment, the process for forming a homogeneous dispersion described above further comprises the step of regenerating the less polar diluents used in the solvent shifting by contacting with a water absorbent. A substantial amount of water containing diluent is generated either in the external phase bath during dialysis or in the filtrate or permeate line during diafiltration. Recovering this shift solvent, drying it over, for instance, molecular sieves and reusing it in the solvent shift process represents a substantial cost savings and a benefit to the environment.

Once the undoped or transition metal-containing, stabilized crystalline or amorphous cerium dioxide nanoparticles are solvent shifted into a less polar (organic) medium by the less polar diluent, such as a glycol or glycol mixture, the nanoparticles are still stabilized with the original nanoparticle stabilizer used in their manufacture; but complexed, for example, by a glycol ether, the mixture can now be dispersed into a non-polar medium such as kerosene, which is compatible with most hydrocarbon fuels such as diesel and biodiesel. The surface of the particle is first functionalized with a surfactant such as oleic acid, and, optionally a co-surfactant such as 1-hexanol, before being added to the non-polar medium. It is important to realize that this composition of matter is not a reverse micelle water-in-oil emulsion, if there is very little water present (less than about 0.5 wt. %); rather, if the surface of the cerium nanoparticle has a positive charge, then it may be complexed by the ether oxygen atoms and bound to the oppositely charged carboxylic acid. The carboxylic acid may be present in a chemisorbed state and may, thereby, facilitate the miscibility of the nanoparticle with a non-polar medium.

In another embodiment, the process for forming a homogeneous dispersion described above contains a surfactant selected from the group consisting of oleic acid, linoleic acid, stearic acid, and palmitic acid, an alcohol, such as 1-hexanol, and a combination thereof. Introduction of the solvent shifted second dispersion containing the less polar than water diluent, such as a glycol or glycol mixture, into a non-polar medium is, once more, facilitated by surfactants that surface-functionalize the nanoparticles. Preferred surfactants are carboxylic acids with carbon chain lengths less than 20 carbon atoms but greater than 3 carbon atoms.

In another embodiment, the process for forming a homogeneous dispersion described above contains a non-polar medium comprising a hydrocarbon containing about 6 to about 20 carbon atoms.

In another embodiment, the process for forming a homogeneous dispersion described above contains a non-polar medium selected from the group consisting of octane, decane, toluene, kerosene, naphtha, ultra low sulfur diesel fuel, biodiesel, and mixtures thereof.

In another embodiment, the process for forming a homogeneous dispersion described above further comprises the step of filtering to remove salts of by-products and reacted materials. This filtering aids in the solvent shifting process that is affected by steps b and c above, wherein it is desirable to reduce the ionic strength to a conductivity of about 5 mS/cm, preferably to about 3 mS/cm or less. For optimal miscibility and stability with non-polar hydrocarbons, it is desirable that very few ions be present in the nanoparticle (e.g. cerium dioxide) dispersion. This situation can be achieved by purifying the nanoparticles by removing ions of salts and by-products, such as ammonium nitrate, through diafiltration to a conductivity level of less than about 5 mS/cm, preferably to about 3 mS/cm or less.

In another embodiment, the process for forming a homogeneous dispersion described above further comprises the step of concentrating the aqueous first dispersion or the second dispersion. In other embodiments, the concentration of stabilized cerium dioxide nanoparticles is greater than about 0.5 molal, or greater than about 1.0 molal, or greater than about 2.0 molal (approximately 35% solids in the dispersion). The inventors have shown that this process can successfully replace a polar continuous phase with a continuous phase that is less polar by at least about 8 polar Hansen Solubility Parameter units or more.

In another embodiment, the process for forming a homogeneous dispersion described above further comprises the step of combining said homogeneous dispersion with a hydrocarbon fuel. In another embodiment, when used as a fuel additive, one part of the homogeneous dispersion is combined with at least about 100 parts of the fuel. In another embodiment, when used as a fuel additive, one part of the homogeneous dispersion is combined with at least about 500 parts of the fuel. In another embodiment, when used as a fuel additive, one part of the homogeneous dispersion is combined with at least about 1000 parts of the fuel.

By way of example, the following publications describe fuel additives containing cerium oxidic compounds: U.S. Pat. Nos. 5,449,387; 7,063,729; 6,210,451; 6,136,048; 6,093,223; 7,195,653 B2; U.S. Patent Appl. Publ. Nos. 2003/0182848; 2003/0221362; 2004/0035045; 2005/0060929; 2006/0000140; International Publ. Nos. WO 2004/065529; and WO 2005/012465.

As is known to those skilled in the chemical arts, cerium dioxide is widely used as a catalyst in converters for the elimination of toxic exhaust emission gases and the reduction in particulate emissions in diesel powered vehicles. Within the catalytic converter, the cerium dioxide can act as a chemically active component, acting to release oxygen in the presence of reductive gases, as well as to remove oxygen by interaction with oxidizing species. The process of the present invention can be used to form a catalyst for this purpose.

Motor oil is used as a lubricant in various kinds of internal combustion engines in automobiles and other vehicles, boats, lawn mowers, trains, airplanes, etc. Engines contain contacting parts that move against each other at high speeds, often for prolonged periods of time. Such rubbing motion causes friction, forming a temporary weld, immobilizing the moving parts. Breaking this temporary weld absorbs otherwise useful power produced by the motor and converts the energy to useless heat. Friction also wears away the contacting surfaces of those parts, which may lead to increased fuel consumption and lower efficiency and degradation of the motor. In one aspect of the invention, a motor oil includes a lubricating oil, transition metal-containing, crystalline, cerium dioxide nanoparticles, desirably having a mean diameter of less than about 10 nm, more preferably about 5 nm, and optionally a surface adsorbed stabilizing agent that is delivered as a homogeneous dispersion in a non-polar medium.

Diesel lubricating oil is essentially free of water (preferably less than 300 ppm) but may be desirably modified by the addition of a cerium dioxide composition in which the cerium dioxide has been solvent shifted from its aqueous environment to that of an organic or non-polar medium. The cerium dioxide compositions include nanoparticles having a mean diameter of less than about 10 nm, more preferably about 5 nm, as already described. A diesel engine operated with modified diesel fuel and modified lubricating oil provides greater efficiency and may, in particular, provide improved fuel mileage, reduced engine wear or reduced pollution, or a combination of these features.

Metal polishing, also termed buffing, is the process of smoothing metals and alloys and polishing to a bright, smooth mirror-like finish. Metal polishing is often used to enhance cars, motorbikes, antiques, etc. Many medical instruments are also polished to prevent contamination in irregularities in the metal surface. Polishing agents are also used to polish optical elements such as lenses and mirrors to a surface smoothness within a fraction of the wavelength of the light they are to manage. Polishing agents may be used for planarization (rendering the surface smooth at the atomic level) of semiconductor substrates for subsequent processing of integrated circuits. Homogeneous dispersions of uniformly dimensioned transition metal-containing cerium dioxide particles in media of reduced polarity relative to water, or in non-polar media, may be advantageously employed as polishing agents in polishing operations.

The invention is further illustrated by the following examples, which are not intended to limit the invention in any manner.

EXAMPLES

Examples 1-4 relate to solvent shifting of undoped cerium dioxide particles from an aqueous dispersion into a continuous phase of reduced polarity. A variety of methods for removing water from the initial solvent shifted mixtures were investigated in order to lower the polarity and to raise the concentration (suspension density) of the final homogeneous dispersion.

Preparation of Cerium Dioxide Nanoparticles Used in Solvent Shifting Experiments for Examples 1-4

To an 11 liter round bottom stainless steel reactor containing 3 side-wall mounted baffles separated by 120 degrees, were added 7,800 grams of distilled water. The water was brought to 20 degrees C. and stirred with a Lightnin® R-100 impeller (Rushton style turbine) at sufficient speed for good mixing. A solution containing 780.0 grams of $Ce(NO_3)_3 \cdot 6H_2O$ dissolved in distilled water to a final volume of 1000.0 ml was added to the reactor. The solution remained clear and had a measured pH of 3.80 at 20 degrees C. Once mixed, 396.5 grams of 2-[2-(2-methoxyethoxy)ethoxy]acetic acid was added to the reactor and allowed to mix. The solution remained clear and had a measured pH of 1.77 at 20 degrees C. At this point, a high sheer mixer in the form of a colloid mill manufactured by Silverson Machines, Inc. that had been modified to enable reactants to be introduced directly into the mixer blades by way of a peristaltic tubing pump, was lowered into the reactor vessel, the mixer head with reactant jets being positioned slightly above the bottom of the reactor vessel. The mixer was set to 8,100 rpm with a perforated screen installed. A solution containing 62.4 gm of 50% hydrogen peroxide was added to the reactor and allowed to mix briefly. A solution of 372.0 grams of 28-30% ammonium hydroxide was pumped into the reactor via a peristaltic pump over a time period of 40 seconds. The colloid mill was removed from the reactor, and the R-100 impeller mixer was returned and operated at a speed setting of 450 rpm. The solution was a dark orange color and the pH was 6.38 at 29 degrees C. The reactor was heated to 70 degrees C. over about 25 minutes. Once 70 degrees C. was achieved, the reactor was held at that temperature for 50 minutes. At this time, the reactor was cooled back to room temperature over about 25 minutes. The solution was dark orange in color, not turbid, and has a pH of 4.51 at 21 degrees C.

The solution was diafiltered using a regenerated cellulose 3000 Dalton filter. Filtration continued with periodic additions of deionized water (18 megohm conductivity) until the solution had a conductivity of about 5 mS/cm. Concentration to a density of about 0.16 grams CeO2 per gram of final solution (16 wt. %) was achieved. Particle sizing by dynamic light scattering indicated a hydrodynamic diameter of 6 nm with a coefficient of variation, COV, (one standard deviation divided by the mean diameter) of 10%. This CeO2 dispersion was called CeO-1.

Example 1

Solvent Shifting by Distillation (Comparative Process)

A series of mixtures (3:1, 1:1 and 1:3 by volume) of CeO-1 and diethylene glycol monomethyl ether (shift solvent) was prepared, which formed homogeneous dispersions. Removal of the water component from these diluted CeO2 dispersions to advance the solvent shift, was attempted by heating the mixtures under a simple distillation column at atmospheric pressure. Distillation of the 1:3 CeO2/glycol ether mixture resulted in an initial distillate fraction at about 110° C., leading to concentration of the CeO2 containing residue. The water content of the residue was monitored periodically by analyzing samples of the residue using a calibrated Head Space Analyzer on a gas chromatograph mass spectrometer (GC-MS). It was observed, however, that when the CeO2 concentration reached about 0.42 grams CeO2 per gram of residue solution, a precipitate formed in the round bottom flask. This ceria containing precipitate could not be redispersed, even with heating. A similar precipitate formed in the residue during distillation of each of the three mixtures examined, thereby substantially limiting the amount of water that could be removed by the distillation process. The lowest water content that was achieved before ceria precipitate appeared in the residue was 20%, which occurred for the 1:3 CeO2/glycol ether mixture (i.e. a reduction of water content from 25% to 20%). Thus, there appears to be substantial limitations on the degree of solvent shifting (water removal) achievable by the distillation process.

Example 2

Solvent Shifting by Rotary Evaporation
(Comparative Process)

A set of homogeneous mixtures (3:1, 1:1 and 1:3 by volume) of CeO-1 and diethylene glycol monomethyl ether (shift solvent) was prepared as in Example 1 above. Removal of water to shift the solvent mixture to greater diethylene glycol monomethyl ether content (less polar), was attempted by rotary evaporation under reduced pressure supplied by a water aspirator and at bath temperatures of 45° C. and 65° C. Water content in the residue was again monitored by analyzing samples in a calibrated Head Space Analyzer on a GC-MS. Similar results to those described above for the distillation process were obtained, in that while concentration of the dispersion mixtures was possible, when the concentration approached about 0.4 grams $CeO_2$ per gram solution, an irreversible precipitate of $CeO_2$ formed, thus limiting the amount of water that could be removed by this process. Solvent shifting with ethylene glycol butyl ether was attempted by the above described procedures, but with similarly limited success.

In addition, a qualitative visual test of sample wetness was conducted by adding 0.5-1.0 mL of the final solvent shifted residue from rotary evaporation to 6 mL of a 2:1 mixture of kerosene and oleic acid, which resulted in a cloudy inhomogeneous solution, indicating that the final residue contained too much water (i.e. greater then about 5 wt %) to be of practical use as a fuel additive.

Example 3

Solvent Shifting by Dialysis (Inventive Process)

General Procedure for Solvent Shifting by Dialysis

A dialysis bag (SPECTRA/POR® Dialysis Membrane, MWCO: 2 kiloDaltons, NFW: 38 mm) was loaded with 15-150 mL of the 0.16 g/g CeO-1 dispersion prepared as described above, and 5-50 mL of a shift solvent such that the volume ratio of $CeO_2$ aqueous dispersion to shift solvent was 3:1. The ends of the bag were folded over and secured (with rubber bands). The bag was placed into a vessel containing 60-600 mL of the shift solvent (external phase) such that the amount of shift solvent used was 3 times the total amount of the solution in the dialysis bag. The external phase shift solvent was stirred using a magnetic stirbar and a stir plate. The dialysis bag was equilibrated for 8 hours, after which the external phase shift solvent was replaced with fresh shift solvent, (once again 3 times the total amount of solution in the dialysis bag), and allowed to equilibrate for 20 more hours. The contents of the bag was analyzed for $CeO_2$ content by thermal gravimetric analysis (TGA) and for water content using a calibrated Head Space Analyzer on a GC-MS.

Dialysis Procedure for Lattice Engineered Cerium Dioxide Samples

Dispersions of lattice engineered $CeO_2$ were evaluated by the general dialysis procedure described above except that the bag was also loaded with a 10% by volume addition of the nanoparticle stabilizer (e.g. MEEA, MAA) used in the preparation of $CeO_2$ containing a single transition metal (e.g. 15 mL $CeO_2$, 5 mL shift solvent, and 2 mL stabilizer), or a 25% nanoparticle stabilizer addition for $CeO_2$ containing more than one transition metal (e.g. 15 mL $CeO_2$, 5 mL shift solvent, and 5 mL stabilizer).

Four glycol ethers were tested as shift solvents by the dialysis method.

Example 3a

Ethylene glycol monobutyl ether (Butyl CELLOSOLVE®, CAS No. 111-76-2, 3.4 polar HSP) was evaluated as a shift solvent by the general dialysis procedure described above. Based on volume changes observed in the dialysis bag, solvent shifting appeared to be proceeding normally after 2 hours. However, after 22 hours the sample had gelled and the procedure was halted. Thus it appears that the particular ceria dispersion used in this test was too concentrated to allow for an extended dialysis using this particular shift solvent.

Example 3b

Propylene glycol n-butyl ether (DOWANOL® PnB, CAS No. 5131-66-8, 4.9 polar HSP) was evaluated as a shift solvent by the general dialysis procedure described above. Solvent shifting appeared to be proceeding normally after 2 hours, however, after 22 hours the sample had gelled and the procedure was halted. Thus it appears that the particular ceria dispersion used in this test was too concentrated to allow for an extended dialysis using this particular shift solvent.

Example 3c

Diethylene glycol monomethyl ether (Methyl CARBITOL®, CAS No. 111-77-3, 7.8 polar HSP) was evaluated as a shift solvent by the general procedure described above. Solvent shifting appeared to be proceeding normally after 2 hours and after 22 hours. The contents of the bag were analyzed by TGA for $CeO_2$ content. Water content was found to be less than 5 wt %.

Example 3d

Propylene glycol methyl ether (1-methoxy-2-propanol, DOWANOL® PM, CAS No. 107-98-2, 7.2 polar HSP) was evaluated as a shift solvent by the general procedure described above. Solvent shifting appeared to be proceeding normally after 2 hours and after 22 hours. The contents of the bag were analyzed by TGA for $CeO_2$ content. Water content was found to be less than 5 wt %.

Example 3e

A mixture containing equal parts of propylene glycol methyl ether and diethylene glycol monomethyl ether (estimated 7.5 polar HSP) was evaluated as a shift solvent by the general procedure described above. Solvent shifting appeared to proceed normally. The contents of the bag were analyzed by TGA for $CeO_2$ content. Water content was found to be less than 5 wt %.

Example 4

Solvent Shifting by Diafiltration (Inventive Process)

In order to find a quicker and thereby more economical method for removing water from a solvent shifted mixture, use of a diafiltration apparatus in combination with addition of the shift solvent to the feed-stream or sample reservoir was investigated.

General Procedure for Solvent Shifting by Diafiltration

A diafiltration apparatus consisting of a sample reservoir (graduate cylinder), a direct drive pump (Micropumps, Inc. Model 27900, L254085), a diafiltration column (Millipore Prep/Scale Spiral Wound TFF-2 Module, 0.23 m2 filtration area, 1 kiloDalton NMWCO, regenerated cellulose ultrafiltration column) and tubing configured in a recirculation loop to return retentate to the sample reservoir was employed. The pump was operated to maintain an outlet pressure of about 18 psi.

A 450 mL sample of aqueous transition metal-containing cerium dioxide nanoparticle dispersion was combined with 150 mL of shift solvent (i.e. 1:1 mixture of 1-methoxy-2-propanol and diethylene glycol monomethyl ether) and placed into the sample reservoir. Following this initial dilution of the sample, the column and tubing was filled using the pump located in the feed-stream line. Once retentate began to return to the sample reservoir, the shift solvent was added drop-wise to the sample reservoir to maintain a constant volume. Thus the rate of loss of filtrate (or permeate) was matched by the addition rate of shift solvent (continuous diafiltration mode). About 1.5 L of shift solvent was typically added over about an 8 hour period. The final sample was concentrated from a total volume of about 600 mL to about 450 mL by operating the column without addition of shift solvent (discontinuous diafiltration mode).

The qualitative visual test of sample wetness described above in Example 2 was performed to confirm that the water content of the final concentrate was less than about 5%. The final concentrates were clear and homogeneous, dark orange in color. Examination by TEM revealed no change in particle size or size distribution (i.e. no evidence of agglomeration). Thus a homogeneous solvent shift of CeO2 nanoparticles from water (16.0 polar HSP) to the glycol ether mixture (est. 7.5 polar HSP) was afforded by the diafiltration process of the invention.

Examples 5-8 relate to solvent shifting by the diafiltration process of the invention for lattice engineered cerium dioxide particles, shifting from an aqueous (continuous phase) dispersion into a mixed glycol ether (continuous phase) of reduced polarity.

Example 5

Figure 1B:
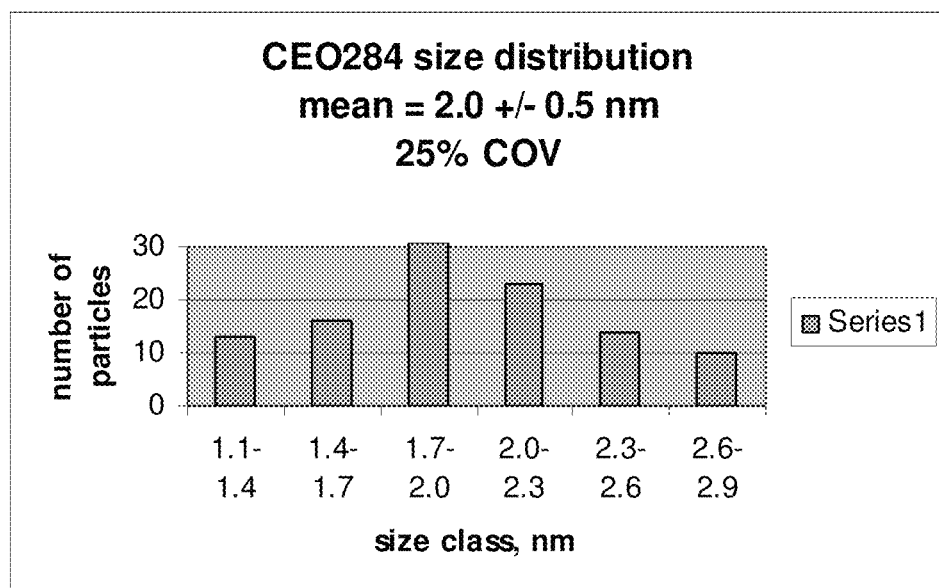

Preparation of $Ce_{0.9}Cu_{0.1}O_{1.95}$ Nanoparticles by Isothermal Double-Jet Reaction To a 3 liter round bottom stainless steel reactor vessel was added 1117 grams of distilled water. An R-100 impeller was lowered into the reactor vessel, and the mixer head was positioned slightly above the bottom of the reactor vessel. The mixer was set to 700 rpm, and the reactor was brought to a temperature of about 70° C. Then 59.8 grams (98%) of methoxyacetic acid were added to the reactor. Metal salt solutions containing 108.0 grams of cerium nitrate hexahydrate, and 6.42 grams of $Cu(NO_3)_3.2.5H_2O$, were dissolved separately, and then combined to form a 250 ml solution. A double jet reaction was conducted over a period of five minutes by pumping the 250 ml solution containing 108.0 grams $Ce(NO_3)_3.6H_2O$ and 6.42 grams $Cu(NO_3)_3.2.5H_2O$ into the reactor concurrently with a solution containing 69.5 grams (28-30%) of ammonium hydroxide. A distilled water chase into the reactor cleared the reactant lines of residual materials. Then 10.2 grams of 50% non-stabilized hydrogen peroxide was added to the reactor and its contents over a period of 40 seconds. Initially, the reaction mixture was an opaque dark orange brownish liquid in the pH range 6 to 7. The reaction mixture was heated for an additional 60 minutes, during which time the pH dropped to 4.25 (consistent with the release of hydronium ion via reactions (1a) and (1b) and the mixture became clear yellow orange color. The reaction was cooled to 20° C. and diafiltered to a conductivity of 3 mS/cm to remove excess water and unreacted materials. This resulted in concentrating the dispersion by a factor of about 10, or nominally 1 Molar in CeO2 particles. Particle size-frequency analysis by transmission electron micrography (FIG. 1A) revealed a mean particle size of 2.5 nm, with size frequency distribution having a coefficient of variation, COV, (one standard deviation divided by the mean diameter) of 25%. FIG. 1B shows the size distribution for nanoparticles produced using this process. Note the absence of a bi-modal distribution; a secondary peak would be an indication that the Cu was not incorporated into the $CeO_2$ lattice but instead existed as a separate $Cu_2O_3$ population.

Example 6

Iron-Containing $CeO_2$ Nanoparticles $Ce_{0.9}Fe_{0.1}O_{1.95}$

Figure 2A:
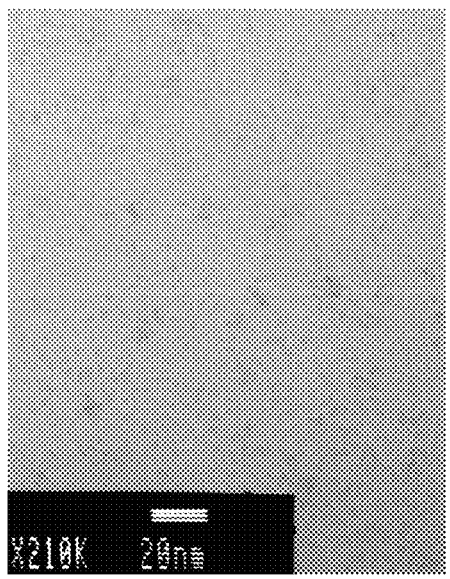
FIGS. 2A and 2B are, respectively, a TEM image and a particle size-frequency analysis by TEM of isothermally processed Fe-containing $CeO_2$ nanoparticles, prepared as described in Example 6.
Figure 2B:
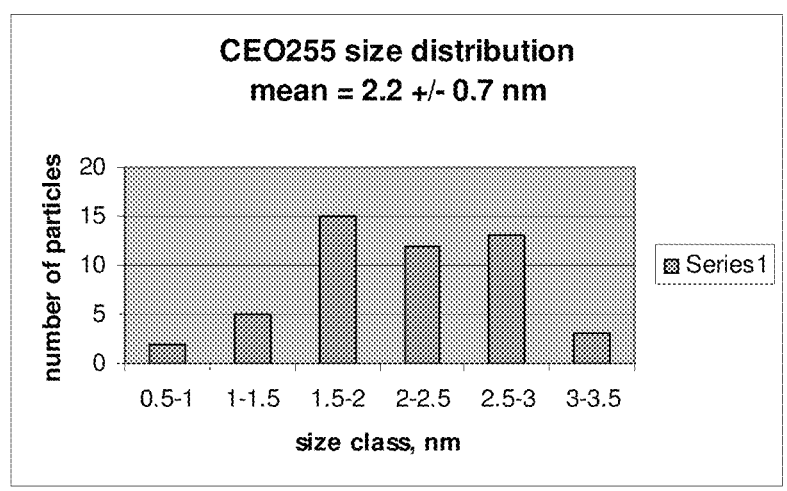

The procedures of Example 5 were repeated, except that the metal salts solution contained 108.0 grams of cerium nitrate hexahydrate, and 11.16 grams of $Fe(NO_3)_3.9H_2O$. These metal salts were dissolved separately and then combined to form a 250 ml solution. The reaction proceeded as described in Example 5. A TEM of the nanoparticles (FIG. 2A) and particle size-frequency analysis by transmission electron micrography (FIG. 2B) revealed a mean particle size of 2.2+/−0.7 nm, with size frequency distribution having a coefficient of variation, COV, (one standard deviation divided by the mean diameter) of 32%. The calculated yield was 55.1%.

Example 7

Zirconium-Containing $CeO_2$ Nanoparticles $Ce_{0.85}Zr_{0.15}O_2$

Figure 3A:
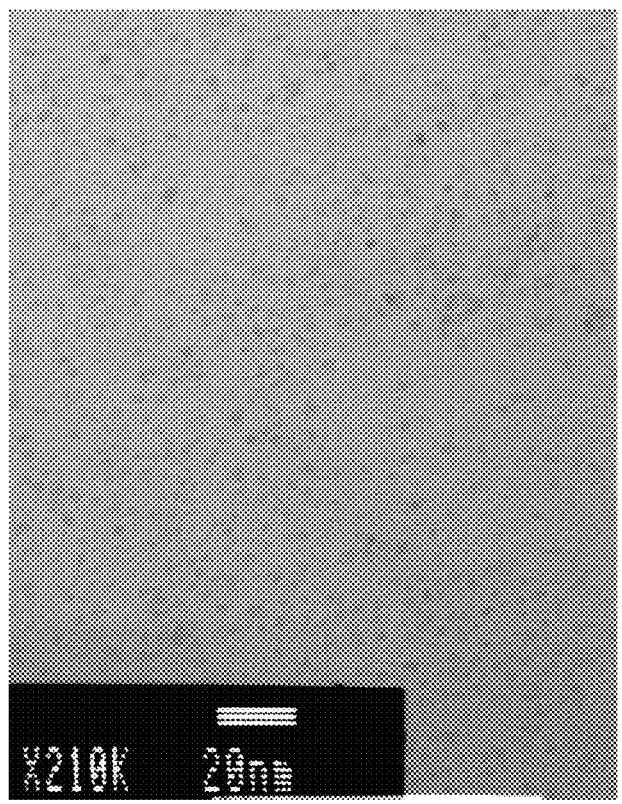
FIGS. 3A and 3B are, respectively, a TEM image and a particle size-frequency analysis by TEM of isothermally processed Zr-containing $CeO_2$ nanoparticles, prepared as described in Example 7.
Figure 3B:
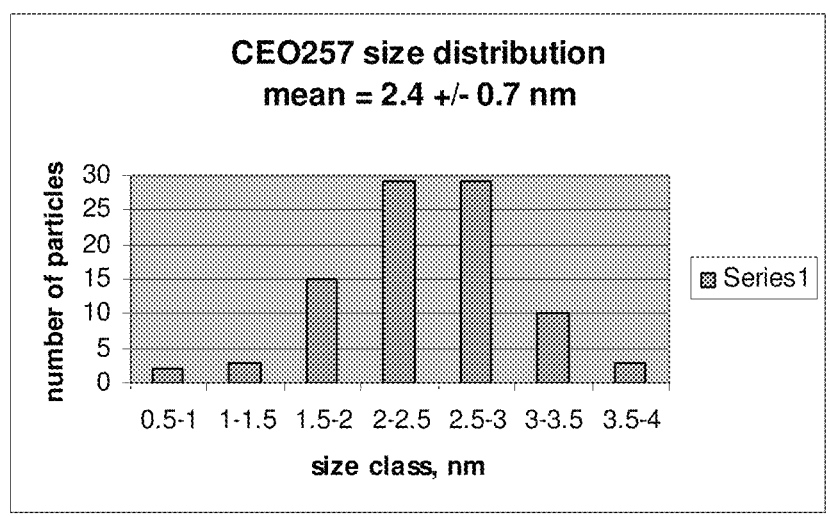

The procedures of Example 5 were repeated except that the metal salts solution contained 101.89 grams of cerium nitrate hexahydrate, and 9.57 grams of $ZrO(NO_3)_2.6\ H_2O$. These metal salts were dissolved separately and then combined to form a 250 ml solution. The reaction proceeded as described in Example 5, except that the temperature of the reaction was carried out at 85° C. Particle size-frequency analysis by transmission electron micrography (FIG. 3A) revealed a mean particle size of 2.4+/−0.7 nm, with size frequency distribution having a coefficient of variation, COV, (one standard deviation divided by the mean diameter) of 29%, as shown in FIG. 3B. Inductively coupled plasma atomic emission spectroscopy revealed a stoichiometry of $Ce_{0.82}Zr_{0.18}O_{1.91}$, which given the relative insolubility of $ZrO_2$ to $CeO_2$, would account for the enhanced Zr content (18% vs. 15%).

Example 8a

Figure 4A:
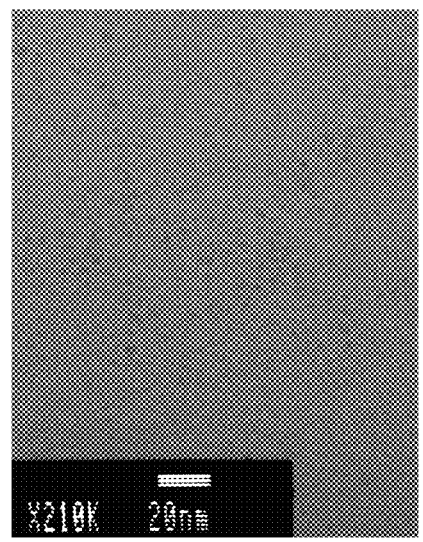
FIGS. 4A and 4B are respectively, a TEM image and a particle size-frequency analysis by TEM of isothermally processed $CeO_2$ nanoparticles containing Zr and Fe, prepared as described in Example 8.
Figure 4B:
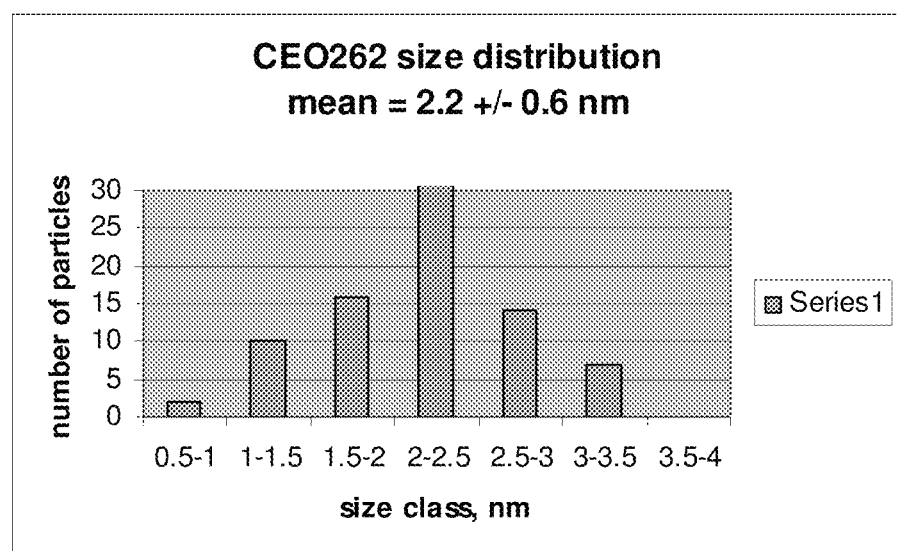
Figure 4C:
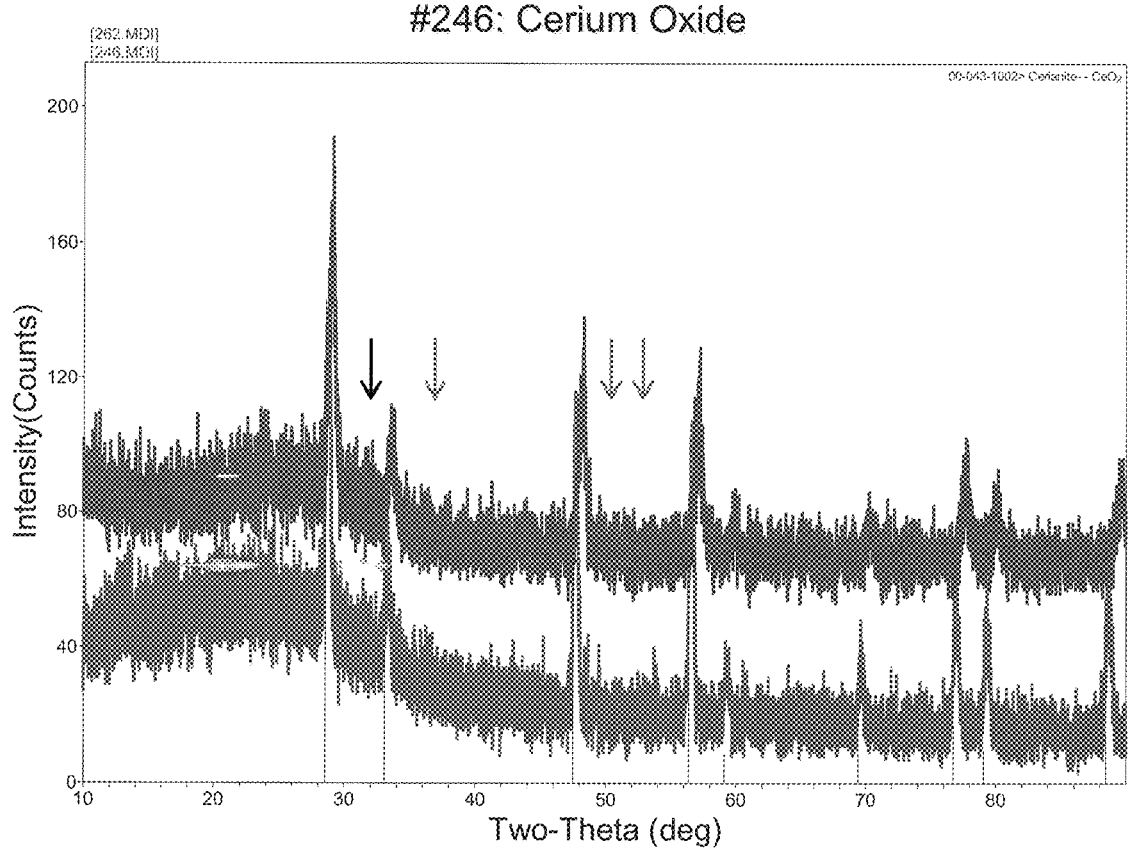
FIG. 4C shows x-ray diffraction spectra of isothermally processed $CeO_2$ nanoparticles and of isothermally processed $CeO_2$ nanoparticles containing Zr and Fe, prepared as described in Example 8.

Zirconium- and Iron-Containing $CeO_2$ Nanoparticles $Ce_{0.7}Zr_{0.20}Fe_{0.1}O_{1.95}$ The producers of Example 5 were repeated, except that the metal salts solution contained 84.0 grams of cerium nitrate hexahydrate, 11.16 grams of $Fe(NO_3)_3.9\ H_2O$ and 12.76 grams of $ZrO(NO_3)_2.6H_2O$. These metal salts were dissolved separately and then combined to form a 250 ml solution. The reaction proceeded as described in Example 4, except that the temperature of the reaction was carried out at 85° C., and the hydrogen peroxide solution (50%) was elevated to 20.4 gm and added over a period of ten minutes. Particle TEM (FIG. 4A) and particle size-frequency analysis by transmission electron micrography (FIG. 4B) revealed a mean particle size of 2.2+/−0.6 nm, with size frequency distribution having a coefficient of variation, COV, (one standard deviation divided by the mean diameter) of 27%. Again, a monodisperse, unimodal distribution supports the idea of co-incorporation as opposed to separately renucleated $ZrO_2$ and $Fe_2O_3$ grain populations. The calculated yield was 78%. Inductively coupled plasma atomic emission spectroscopy revealed a stoichiometry of $Ce_{0.69}Fe_{0.14}Zr_{0.17}O_{0.915}$. Again, the relatively more concentrated Fe and Zr with respect to the nominal amounts reflects the greater insolubility of their hydroxide precursors relative to that of cerium hydroxide. Also in FIG. 4C is an x-ray powder diffraction pattern of this sample (top curve) compared to the transition metal free $CeO_2$. The lack of a peak (denoted by an arrow) at 32 deg two theta means that there is no free $ZrO_2$, i.e., it is all incorporated into the cerium lattice. Also, the lack of peaks at 50 and 52 degrees two theta indicate no separate population of $Fe_2O_3$ (i.e. incorporation of Fe into the cerium lattice). Note the shift to larger 2 theta at large two theta scattering angle, which indicates a distortion or contraction of the lattice- ($n\lambda/2d=\sin\theta$) which is consistent with the smaller ionic radii of $Fe^{3+}$ (0.78 A) and $Zr^{4+}$ (0.84 A) relative to the $Ce^{4+}$ (0.97 A) which it is replacing. Thus, we conclude that the transition metals are incorporated into the $CeO_2$ lattice and do not represent a separate population of neat $ZrO_2$ or $Fe_2O_3$ nanoparticles. The unimodal size-frequency distribution also supports this conclusion.

Examples 8b-d

Zirconium- and Iron Containing $CeO_2$ Nanoparticles Varying Systematically in the Amount of Iron (10%, 15%, 40%) at 15% Zirconium The procedures of Example 8a were followed; however the amount of iron or zirconium was adjusted to give the nominal stoichiometries indicated in Table 1 below, using an appropriate metal containing nitrate salt solution while the overall cerium nitrate hexahydrate was reduced to accommodate the increased concentration of the iron or zirconium transition metal.

Aqueous nanoparticle dispersions prepared as described above in Examples 5-8 were treated using the general procedures for diafiltration described above in Example 4, followed by the qualitative visual test for sample wetness. Results are shown in Table 1 below.

TABLE 1

Solvent Shifting by Diafiltration Results for Lattice Engineered $CeO_2$

| Example | Nominal Composition | Wetness Test Results |
|---|---|---|
| 5 | $Ce_{0.9}Cu_{0.1}O_{1.95}$ | Clear/homogeneous |
| 6 | $Ce_{0.9}Fe_{0.1}O_{1.95}$ | Clear/homogeneous |
| 7 | $Ce_{0.9}Zr_{0.1}O_{1.95}$ | Clear/homogeneous |
| 8a | $Ce_{0.7}Zr_{0.2}Fe_{0.1}O_{1.95}$ | Clear/homogeneous |
| 8b | $Ce_{0.75}Zr_{0.15}Fe_{0.1}O_{1.95}$ | Clear/homogeneous |
| 8c | $Ce_{0.70}Zr_{0.15}Fe_{0.1}O_{1.925}$ | Clear/homogeneous |
| 8d | $Ce_{0.45}Zr_{0.15}Fe_{0.4}O_{1.80}$ | Clear/homogeneous |

The results shown above indicate that each aqueous dispersion sample from Examples 5-8 was successfully solvent shifted to the glycol ether mixture (1:1 mixture of 1-methoxy-2-propanol and diethylene glycol monomethyl ether), and that the water content of the final concentrate was less than about 5%. No evidence of agglomeration was observed. Thus a homogeneous solvent shift of a variety of lattice engineered $CeO2$ nanoparticles from water (16.0 polar HSP) to the glycol ether mixture (est. 7.5 polar HSP) was afforded by the diafiltration process of the invention.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

The invention claimed is:

1. A process for replacing the continuous phase of a stable homogeneous nanoparticle dispersion with a less polar phase, the process comprising:
   filtering the dispersion through a diafiltration filter comprising a semi-permeable membrane to remove said continuous phase while maintaining a stable homogeneous nanoparticle dispersion, and
   introducing the less polar phase, maintaining a stable homogeneous nanoparticle dispersion as the continuous phase is replaced with the less polar phase.

2. The process according to claim 1, wherein said less polar phase is reduced in polarity by at least about 4 polar Hansen Solubility Parameter units relative to said continuous phase.

3. The process according to claim 1, wherein said less polar phase is reduced in polarity by at least about 8 polar Hansen Solubility Parameter units relative to said continuous phase.

4. The process according to claim 1, wherein said nanoparticle dispersion comprises cerium dioxide nanoparticles.

5. The process according to claim 1, wherein said nanoparticle dispersion comprises transition metal-containing cerium dioxide nanoparticles.

6. The process according to claim 5, wherein said transition metal-containing cerium dioxide nanoparticles comprise at least one of iron, copper and zirconium.

7. The process according to claim 1, wherein said continuous phase comprises water.

8. The process according to claim 1, wherein said nanoparticle dispersion comprises nanoparticles of cerium dioxide.

9. The process according to claim 1, wherein said less polar phase comprises a glycol ether.

10. The process according to claim 9, wherein said glycol ether is selected from the group consisting of diethylene glycol monomethyl ether, 1-methoxy-2-propanol, and a combination thereof.

11. The process according to claim 1, wherein said dispersion comprises said nanoparticles at a concentration of at least 2 wt.% and water at a maximum concentration of about 5.0 wt.%.

12. The process according to claim 1, wherein said dispersion comprises water at a maximum concentration of about 0.4 wt.%.

13. The process according to claim 1, wherein the steps are carried out simultaneously or sequentially.

14. A process for forming a stable homogeneous dispersion containing stabilized cerium dioxide nanoparticles, said process comprising:
   a) providing an aqueous first stable homogeneous dispersion comprising stabilized cerium dioxide nanoparticles;
   b) introducing a diluent less polar than water to the stable homogeneous dispersion, maintaining a stable homogeneous dispersion of said stabilized cerium dioxide nanoparticles;

c) filtering the aqueous stable homogeneous dispersion through a diafiltration filter comprising a semi-permeable membrane to remove water; and
d) combining the filtered stable homogeneous dispersion with a surfactant and a non-polar medium, thereby forming said stable homogeneous dispersion containing stabilized cerium dioxide nanoparticles.

15. The process according to claim 14, wherein said nanoparticles comprise stabilized transition metal-containing cerium dioxide nanoparticles.

16. The process according to claim 15, wherein said transition metal-containing cerium dioxide nanoparticles comprise at least one of iron, copper and zirconium.

17. The process according to claim 14, wherein said nanoparticles are characterized by a mean hydrodynamic diameter in the range of about 1 nm to about 10 nm and a geometric diameter of less than about 4 nm.

18. The process according to claim 14, wherein said surfactant is selected from the group consisting of oleic acid, 1-hexanol, and a combination thereof.

19. The process according to claim 14, wherein said non-polar medium comprises a hydrocarbon containing about 6 to about 20 carbon atoms.

20. The process according to claim 19, wherein said non-polar medium is selected from the group consisting of octane, decane, toluene, kerosene, naphtha, ultra low sulfur diesel fuel, biodiesel, and mixtures thereof.

21. The process according to claim 14, wherein said less polar diluent comprises a nonionic surfactant.

22. The process according to claim 14, wherein said less polar diluent comprises a glycol ether.

23. The process according to claim 22, wherein said glycol ether is selected from the group consisting of diethylene glycol monomethyl ether, 1-methoxy-2-propanol, and a combination thereof.

24. The process according to claim 14, further comprising the step of filtering to remove salts of by-products and unreacted materials.

25. The process according to claim 14, further comprising the step of concentrating said first dispersion or said second dispersion.

26. The process according to claim 14, further comprising the step of repeating step b and step c in sequence one or more times before completing step d.

27. The process according to claim 14, further comprising the step of regenerating said less polar diluent by contacting with molecular sieves, thereby removing water.

28. The process according to claim 27, wherein said homogeneous dispersion comprises water at a maximum concentration of 0.4 wt.%.

29. The process according to claim 14, wherein said homogeneous dispersion comprises said nanoparticles at a concentration of at least 2 wt.% and water at a maximum concentration of about 5.0 wt.%.

30. The process according to claim 14, further comprising the step of combining said homogeneous dispersion with a hydrocarbon fuel.

31. The process according to claim 14, wherein steps b) and c) are carried out simultaneously or sequentially.

* * * * *